(12) United States Patent
Weiser et al.

(10) Patent No.: US 7,260,445 B2
(45) Date of Patent: Aug. 21, 2007

(54) SYSTEM AND METHOD FOR CUSTOMIZED INDUSTRIAL TEXTILE COLORATION

(75) Inventors: Juergen Weiser, Schriesheim (DE); Gerald Neuville, Heidelberg (DE); Klaus Tiedemann, Limburgerhof (DE); John Provost, Eccleston (GB)

(73) Assignee: BASF Aktiengesellschaft, Ludwigshafen (DE)

( * ) Notice: Subject to any disclaimer, the term of this patent is extended or adjusted under 35 U.S.C. 154(b) by 18 days.

(21) Appl. No.: 10/874,189

(22) Filed: Jun. 24, 2004

(65) Prior Publication Data

US 2006/0015207 A1    Jan. 19, 2006

(51) Int. Cl.
    *G06F 19/00* (2006.01)
(52) U.S. Cl. .................................... 700/133
(58) Field of Classification Search ............... 700/130, 700/131, 132, 133, 134, 135, 136; 396/3
See application file for complete search history.

(56) References Cited

U.S. PATENT DOCUMENTS

| | | | | |
|---|---|---|---|---|
| 4,136,452 | A * | 1/1979 | McMillan ................... | 33/17 R |
| 5,548,519 | A * | 8/1996 | Park et al. .................. | 700/135 |
| 5,680,314 | A * | 10/1997 | Patterson et al. ........... | 700/132 |
| 5,956,525 | A * | 9/1999 | Minsky ....................... | 396/3 |
| 6,090,158 | A * | 7/2000 | McLaughlin ................ | 8/400 |
| 6,173,211 | B1 * | 1/2001 | Williams et al. ............ | 700/131 |
| 6,473,671 | B1 | 10/2002 | Yan | |
| 6,499,513 | B1 * | 12/2002 | Couch ................... | 112/470.03 |
| 6,516,240 | B2 * | 2/2003 | Ramsey et al. ............. | 700/131 |
| 6,546,309 | B1 * | 4/2003 | Gazzuolo .................... | 700/132 |
| 6,564,118 | B1 * | 5/2003 | Swab .......................... | 700/131 |
| 2003/0139840 | A1 | 7/2003 | Magee et al. | |

FOREIGN PATENT DOCUMENTS

EP    0 838 167    4/1998
JP    2004-130015    4/2004

* cited by examiner

*Primary Examiner*—Danny Worrell
(74) *Attorney, Agent, or Firm*—Oblon, Spivak, McClelland, Maier & Neustadt, P.C.

(57) ABSTRACT

A method and system for customized industrial textile goods manufacturing in which, under control of a client system, information is retrieved relating to the design of a customized textile good to be manufactured; desired design data is selected from one or more databases; additional individual data is optionally input; and the selected and inputted data is sent to a manufacturing system as a request for manufacture; and, under control of a manufacturing system, the request is received; an order for manufacturing a customized textile good is generated; uncut uncoloured fabric inventory material is provided; and the uncoloured fabric inventory material is subsequently coloured, cut and sewn in a combined process in order to obtain a finished customized textile good according to the request, whereby colouring of the uncoloured fabric inventory material is performed by means of a digital a digital coloration apparatus.

57 Claims, 8 Drawing Sheets

SYSTEM AND METHOD FOR CUSTOMIZED INDUSTRIAL TEXTILE COLORATION

FIELD OF THE INVENTION

The present invention relates to the field of colored textile production and more particularly to the production of customized colored apparel, home and office decoration textiles as well as technical textiles.

DESCRIPTION OF THE RELATED ART

Colored textiles, especially printed textiles, apparel and home and office decoration products, are fashion-driven goods. The classical fashion product is the apparel good. Home and office decoration textiles can be, for example, blinds, curtains, sun blinds, chair and other furniture covers, bed linen and sheets, cushion covers, etc. The fashion aspect even extends to technical textiles due to changes in consumer lifestyle. Technical textiles comprise cleaning, furniture, household textiles and floor coverings, geotextiles and civil engineering, medical and hygiene, protective clothing, sports and leisure. As consumer leisure time increases, so does the demand for specialist sports goods, many of which are reinforced by high-tech materials. Sailing, windsurfing, ballooning and parachuting would not be possible without light and durable fiber-based materials.

Over recent years, fashion cycles have become shorter. Trends that go along with shorter cycles are mass customization and individualization. As a result of this, the production lot sizes per order have experienced drastic reduction. The average run length of printed fabrics per colourway has reduced by 50 percent from 1,400 meters to 700 meters over the last 10 years.

The textile supply chains especially for apparel goods are complex, long and inefficient. Private labels and branded goods can have lead times from the fiber production to selling of the finished product of almost one year. The decision on design and style as well as size of apparel goods being made almost one year before these goods will be sold results in a mismatch between supply and demand. The storage of textile goods as apparel goods at the retail end is a waste in economical terms, but is a result of the long lead times mentioned before and due to long and inefficient supply chains. In order to meet the demands of shorter fashion cycles and satisfy mass customisation or individualisation, lead times have to be reduced dramatically.

Today, textile goods are colored in the fiber, yarn or the fabric. Printed textile goods are primarily printed by means of screen-printing technologies on fabrics, particularly in low labour cost countries. The advantage of the high printing speed of screen-printing is offset by the low flexibility of screen-printing regarding design changes. The engraving of the screens, the setting up of the printing machine and the mixing of the colours is time consuming and expensive and not economical when small lots sizes are run. Therefore screen printing is not able to fulfill the demand of retailers and brand owners in terms of quick response. Also, coloration of fibers, yarn or fabrics in the dyeing process is time consuming and does not correspond with the demand of short delivery times.

Progress in this respect can be achieved by using digital coloration techniques. As in modern textile coloration, textile designs are available in digital format, so this digital information can be used in digital techniques directly, increasing the flexibility in view of design changes and providing the desired quick response.

U.S. Pat. No. 6,173,211 B1 discloses an apparatus and method for making fabric pattern pieces from work material with each pattern piece carrying a printed design for assembly into garments and the like, having a fabric design with design features arranged in a predetermined manner with respect to the lines defining the boundary of the piece. The fabric design, which is printed on the fabric web by a computer-controlled dye-jet process, is printed only within the outlines of the desired pattern pieces. Patterned templates are arranged in nested relation to produce a cutting and printing marker. This marker is utilized to control the printer which prints the desired pattern pieces on a sheet of plain unprinted fabric. The pattern pieces, printed with the appropriately aligned fabric design, are then cut from the fabric web.

It is therefore an aspect of the present invention to provide a system and method for customized industrial textile coloration combining the coloration step with the cutting and sewing steps in order to individually alter the design, layout, color, style and size of the fabric product at the same time, thus reducing the so-called lead time. Moreover, it is an aspect of the present invention to move the coloration step within, at or by the cut and sew operation by using flexible digital coloration systems.

SUMMARY OF THE INVENTION

One aspect of the invention thus provides a method and a system for customized industrial textile goods manufacturing, the system including a client system side and a manufacturing system side. Information relating to the design of a customized textile good to be manufactured is retrieved and desired design data is selected from one or more databases. Then, additional individual data is inputted optionally and the selected and the inputted data is sent to the manufacturing system where the data is received as a request for manufacture. The manufacturing system generates, on the basis of the received data, an order for manufacturing a customized textile good.

The manufacturing of the textile good can be performed in different manners, by either providing uncut uncolored fabric inventory material, by providing pre-cut uncolored fabric inventory material or by providing a (pre-cut and pre-sewn) uncolored textile good. In possible first and second embodiments of the invention, the choice of providing either uncut or pre-cut uncolored fabric inventory material is pre-selected or determined by the way the system is set up. In these cases the fabric will be colored in the next step followed by a sewing step. In a possible third embodiment of the invention, the system is set up to select a cut and sewn uncolored textile good to be colored afterwards depending on the request.

In the case of providing uncut uncolored fabric inventory material, the provided uncolored fabric inventory material is colored (i.e. printed or dyed), cut and sewn in a combined process in order to obtain a finished customized textile good according to the request. In the case of providing pre-cut uncolored fabric inventory material, the pre-cut uncolored fabric inventory material is colored and sewn in order to obtain a finished customized textile good according to the request, whereby coloration of the uncolored fabric inventory material is performed in both cases by means of a digital coloring apparatus, for example by a digital printing apparatus. In the case of providing cut and sewn uncolored textile goods the coloration of uncolored textile goods is done by means of a digital coloring apparatus also. It is to be understood that the term "printing" in the context of this application is not limited to pattern printing but also extends to plain coloration of textile fabrics. Finally, the manufactured colored customized textile garment is shipped to the purchaser directly or via a retail or other point of sale location.

An aspect of the invention thus provides for a digital coloration system for industrially produced customized mass textile goods with reduced lead times. This is achieved by providing an integrated manufacturing system using modem digital printing technology combined with a user oriented computerized network system, combining the manufacturing of the customized textile good at the site where the uncolored "ready-to-color" textile is provided, colored and sewn, which usually is remote from the retailer and/or the client system.

The invention also covers a computer program product with program code embedded therein which is suitable for carrying out a process as described above when the program code is run on a computer.

Further features and embodiments of the invention will become apparent from the description and the accompanying drawings.

It will be understood that the features mentioned above and those described hereinafter can be used not only in the combination specified but also in other combinations or on their own, without departing from the scope of the present invention.

BRIEF DESCRIPTION OF THE DRAWINGS

The invention is schematically illustrated in the drawings by means of an exemplary embodiment and is hereinafter explained in detail with reference to the drawings. It is understood that the description is in no way limiting on the scope of the present invention and is merely an illustration of one embodiment of the invention, in which.

DETAILED DESCRIPTION

Figure 1:
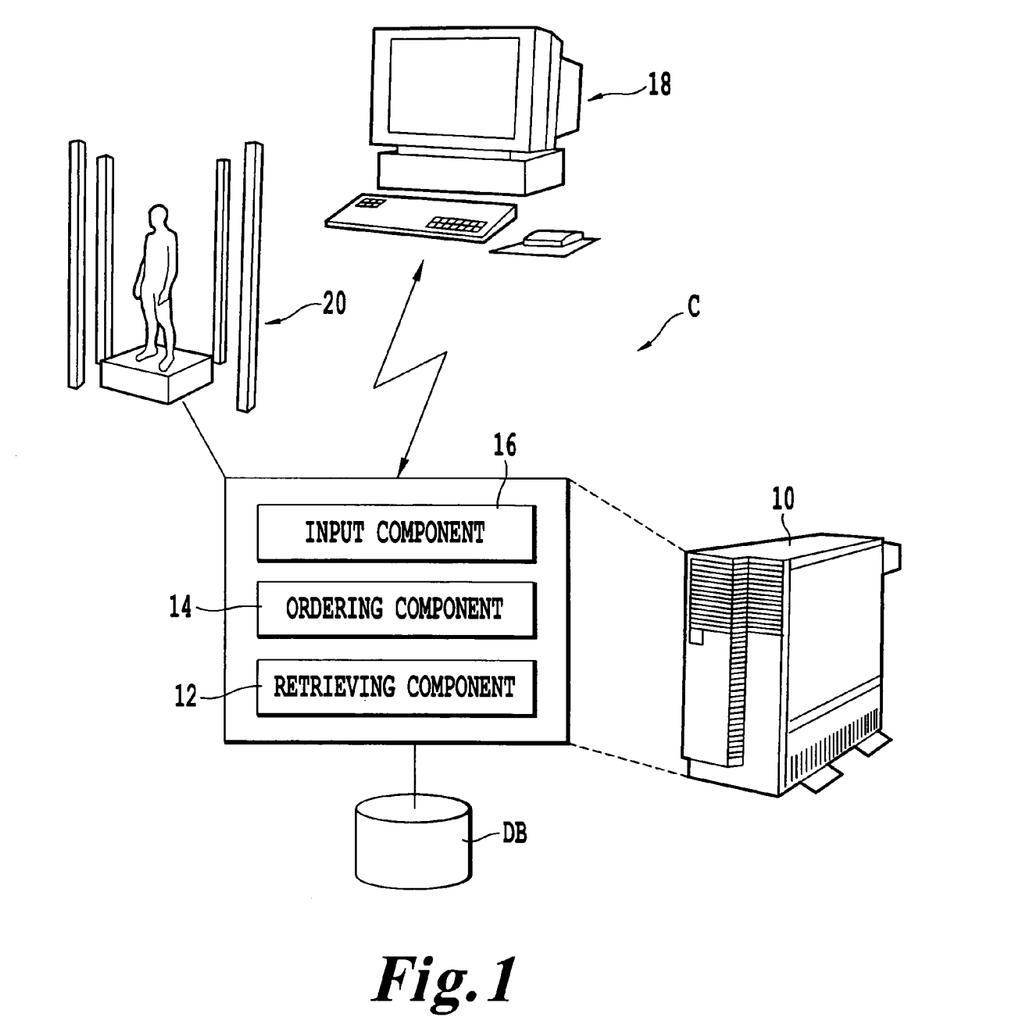
FIG. 1 is a diagrammatic depiction of a first embodiment of a client system for customized industrial textile coloration according to the invention.

FIG. 1 shows a first embodiment of a client system 5 for customized industrial textile coloration. The client system 5 comprises a computer 10 (including a central processing unit (CPU)) for running computer code to implement the various functionality described herein, and the COMPUTER 10 is linked to a database DB containing data and information relating to the design of a customized textile good. It will be understood that the client system 5 may be linked to more than one database. This link may be either direct (e.g., the database is stored locally in the computer 10) or indirect (i.e., the database is stored remotely from the computer 10 and the remote database is accessed via a communication protocol (e.g., TCP/IP) by the computer 10).

Further, the computer 10 implements several modules or components. Particularly, the computer 10 implements a retrieving component 12 for retrieving information from the database DB, and a display component 18 for displaying the data and information retrieved from the database DB. The computer 10 also comprises an input component 16 and an ordering component 14 which will be described in more detail below. The input component may be coupled to a body scanner device as depicted in the example of FIG. 1 with reference numeral 20. Of course, the computer 10 may contain further components which are not shown in FIG. 1.

Figure 2:
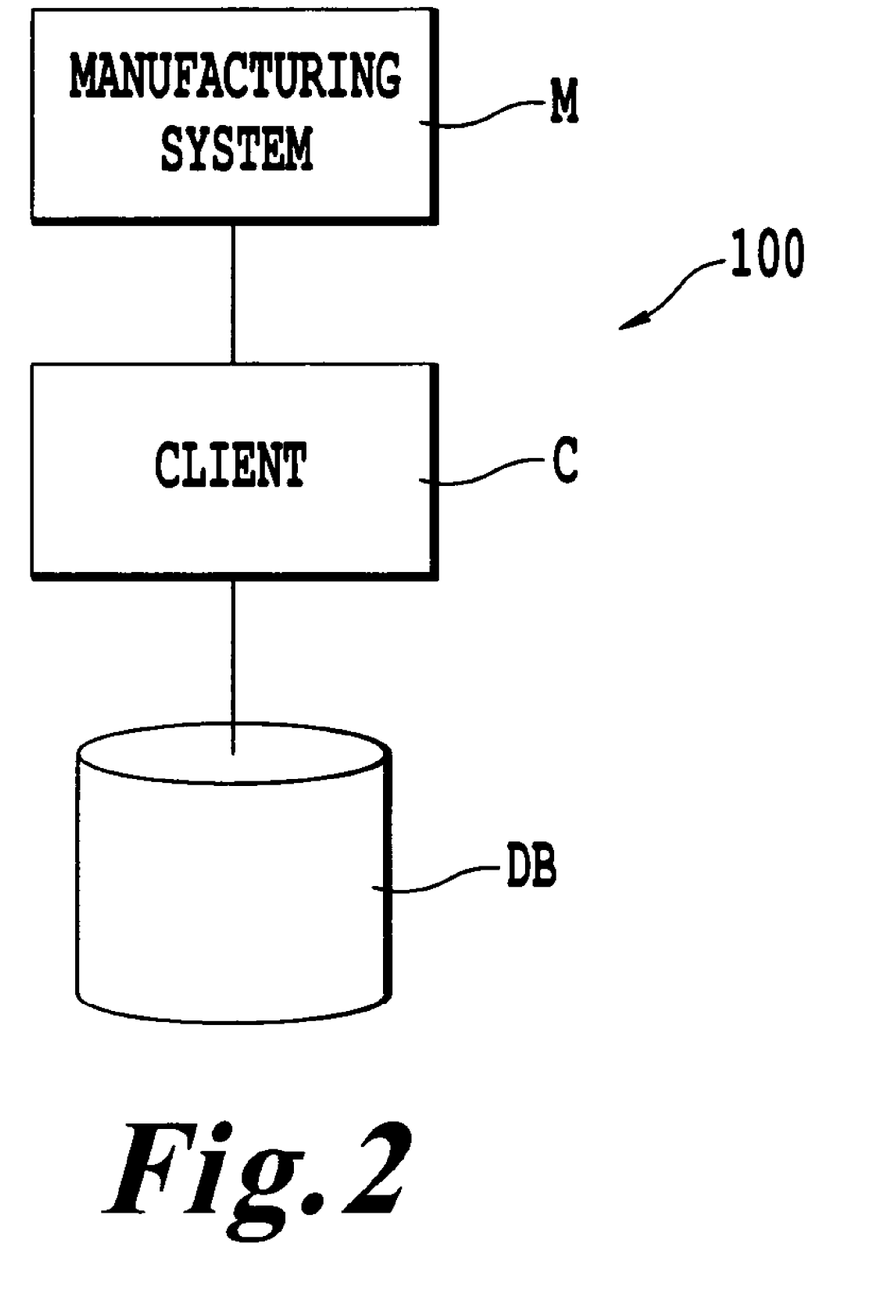
FIG. 2 is a diagrammatic depiction of a first embodiment of a system for customized industrial textile coloration according to the invention.

FIG. 2 shows a first embodiment of a system for customized industrial textile coloration 100. The system 100 shown in FIG. 2 includes two subsystems, a manufacturing system M and a client system 5, both of which are interconnected one with each other, either directly or indirectly.

The client system 5 can be of the structure as illustrated in connection with FIG. 1 and is linked to a database DB.

Figure 3A:
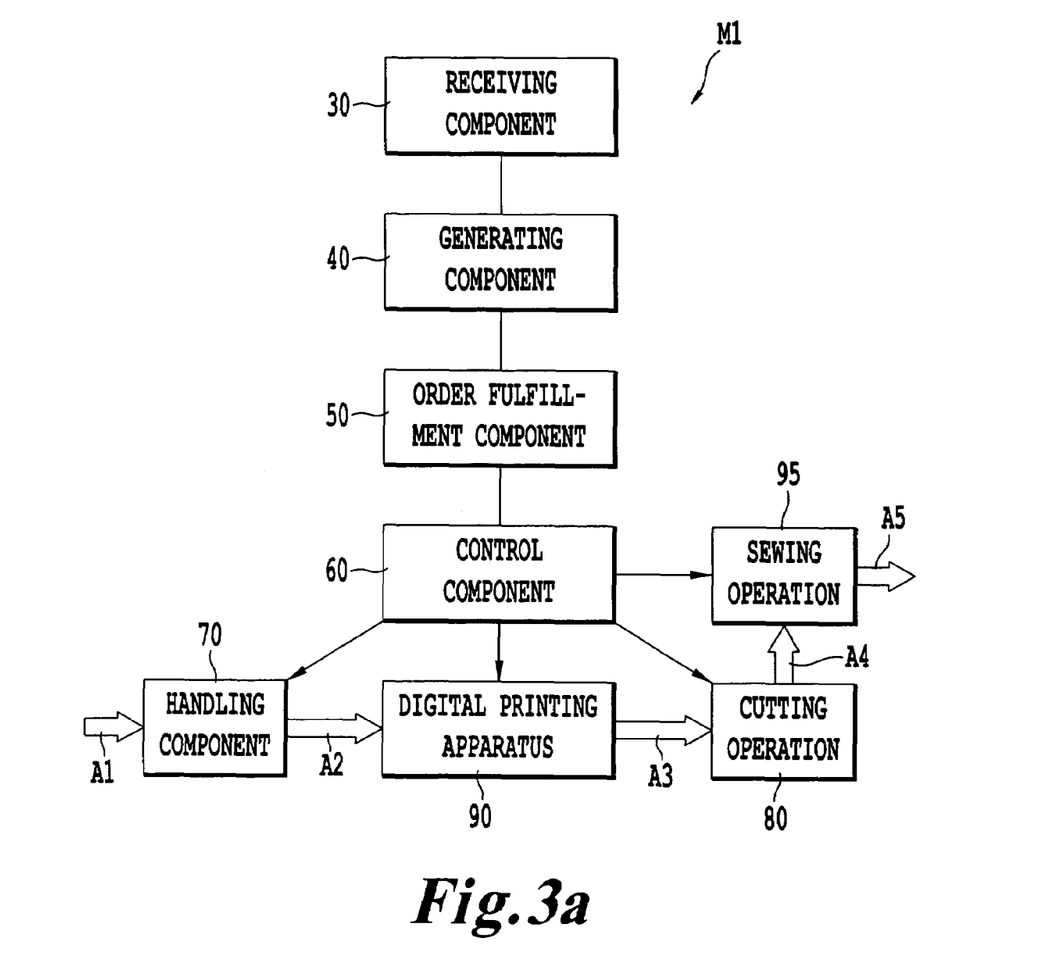
FIG. 3a is a diagrammatic depiction of a first embodiment of a manufacturing system for customized industrial textile coloration according to the invention.

The manufacturing system is arranged and designed to receive a request for manufacture of a customized textile good from the client system 5 and, on the basis of this request, manufacture the requested textile good. Such a manufacturing system M1 is illustrated in FIG. 3a and may comprise the following: a receiving component 30 for receiving a request for manufacture of a customized textile good containing custom selected data; a generating component 40 for generating an order of manufacture; and an order fulfilment component 50 for generating order fulfilment control instructions.

The manufacturing system M1 further comprises a handling component 70 for providing uncolored uncut fabric inventory material (from a roll) in response to said instructions and a digital printing apparatus 90 for printing said uncolored fabric inventory material in response to said instructions. Both the handling component 70 and the digital printing apparatus 90 are controlled by an instruction execution control component 60 which controls the execution of the fulfilment control instructions of the order fulfilment component 50 by said handling component and said digital printing apparatus. Arrows A1, A2, A3, A4, A5 depict the material flow of the fabric to and from (A1, A2) the handling component 70 to the digital printing apparatus 90 as well as the colored fabric (A3) from the digital printing apparatus 90. The flow followed by arrow A3 goes to a cutting operation 80 and following arrow A4 to a sewing operation 95 and continues at arrow A5 to the client.

It will be understood that the manufacturing system described above would also work without a cutting operation if the handling component were to handle and provide pre-cut fabric material to the digital printing apparatus. Of course, all steps described above and below in connection with digital printing may also be performed by digital dyeing by means of a digital dyeing apparatus.

Figure 3B:
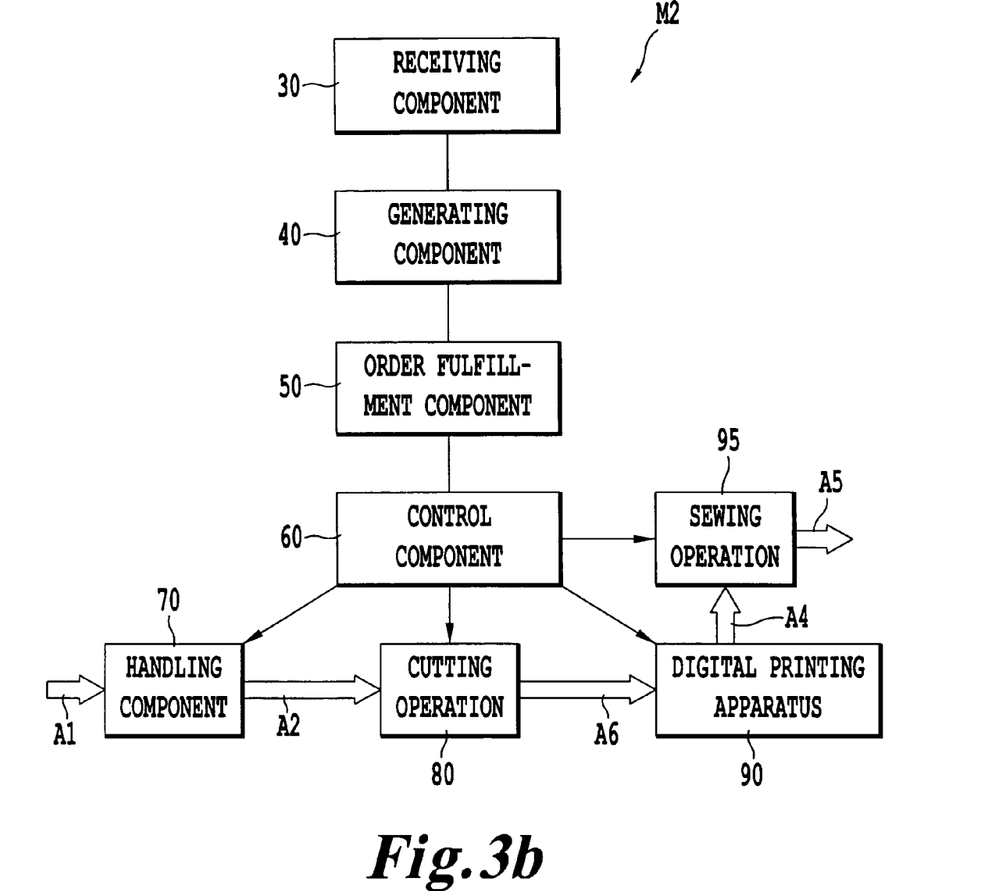
FIG. 3b is a diagrammatic depiction of a second embodiment of a manufacturing system for customized industrial textile coloration according to the invention.
Figure 4:
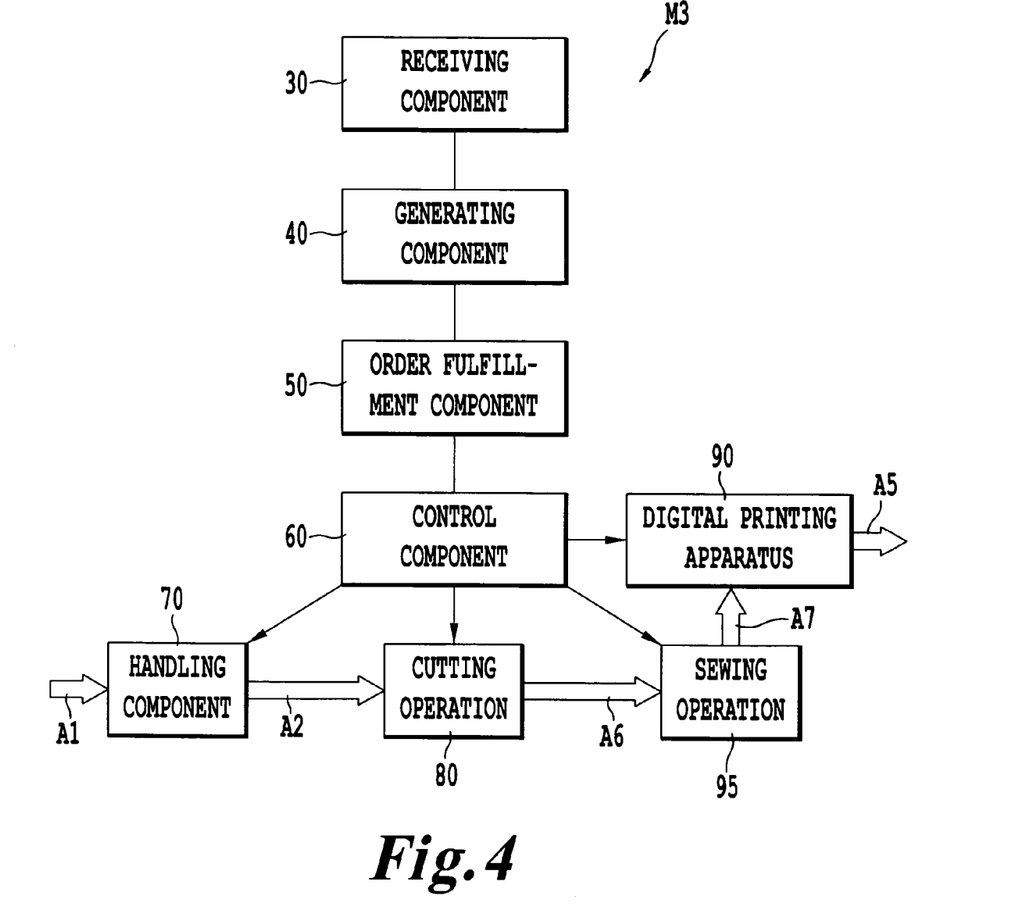
FIG. 4 is a diagrammatic depiction of a third embodiment of a manufacturing system for customized industrial textile coloration according to the invention.

Another possible embodiment of a manufacturing system is shown in FIG. 3b. FIG. 3b shows a manufacturing system M2 which is very similar to the manufacturing system M1 of FIG. 3a as described above, and like components and apparatus are referred to with like numerals. In comparison with the manufacturing system M1 of FIG. 3a, the manufacturing system M2 of FIG. 3b comprises a cutting apparatus 80 which is located in line between the handling component 70 and the digital printing apparatus 90, such that with this second embodiment manufacturing system M2 uncut uncolored fabric can be provided by the handling component 70 which is then cut by the cutting apparatus 80, the cut uncolored fabric being further passed on to the digital printing apparatus 90 where it is colored or printed (depicted by means of arrows A1, A2, A6). Following the coloration step (A4) a sewing operation, e.g. by means of a suitable sewing apparatus, at 95 leads to a finished textile good where the material flow (A5) continues to the client.

Figure 7:
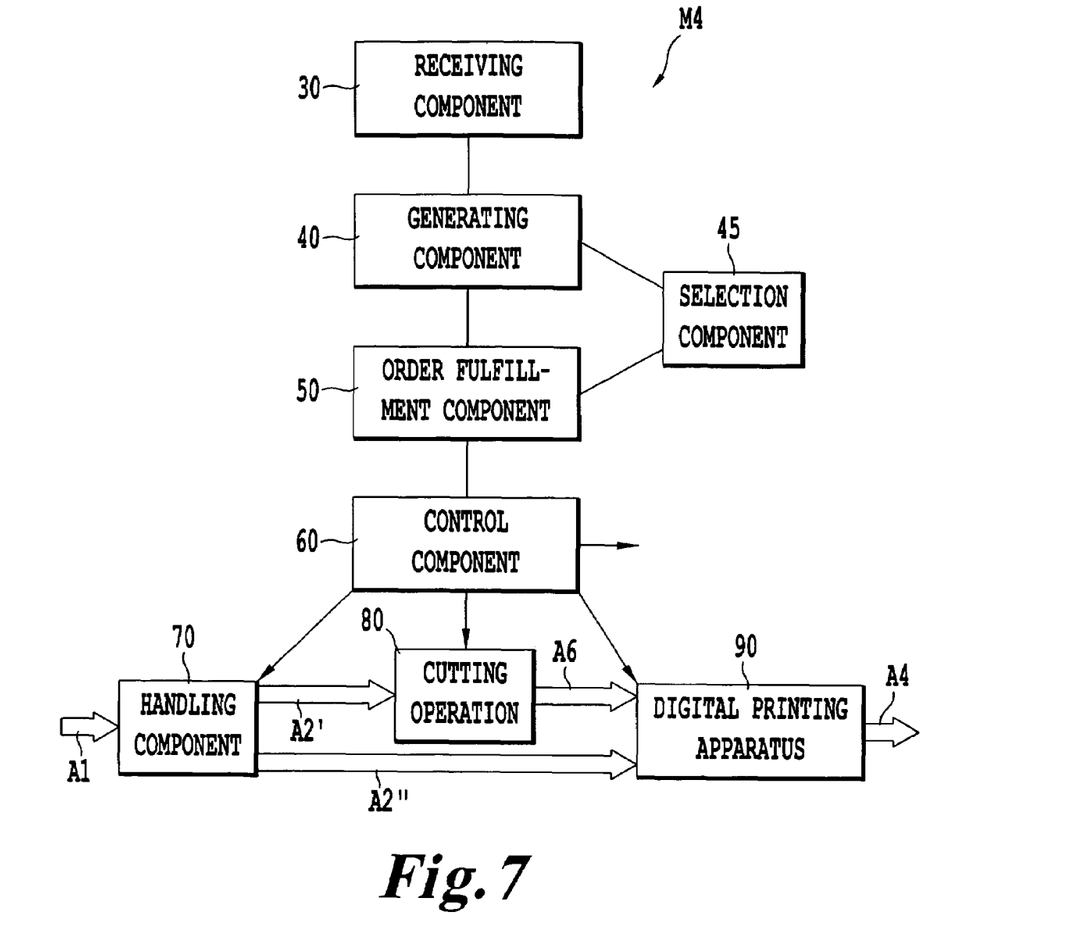
FIG. 7 is a diagrammatic depiction of a fourth embodiment of a manufacturing system for customized industrial textile coloring according to the invention.

The manufacturing system may be alternatively designed in such a manner that the handling component can provide uncut or pre-cut uncolored fabric depending on a selection taken by a selection component 45 which prompts the order fulfilment component 50 to generate order fulfilment control instructions in response to this selection (cf. manufacturing system M3 of FIG. 7). The manufacturing system M3 of FIG. 7 is thus able to make a selection and then provide, on the basis of this selection, either uncut or pre-cut uncolored fabric. In another embodiment (not shown), the manufacturing system may be set up in such a manner that the selection component selects whether the handling component shall provide unsewn pre-cut fabric or pre-cut and pre-sewn fabric. Of course, all other possible combinations of providing fabric can be considered by the person skilled in the art when setting up a system according to the invention.

In operation of the system for customized industrial textile coloration 100, a client or user wishing to purchase a piece of textile or garment, such as any colored apparel or home or office decoration textile may first retrieve information relating to the design of a customized textile to be manufactured. This information is retrieved from database DB by means of the retrieving component 12 and displayed to the user by means of the display component 18. Such information may be textual or graphical and may include a model (e.g., a CAD model) in either two-dimensional or three-dimensional form. In an embodiment that utilizes a model, the recipient optionally may be able to interact with the model (e.g., rotate it, apply custom textures, and/or display under varying light conditions).

The user may then select appropriate data from the displayed data by means of appropriate input devices such as keyboard, monitor, mouse or trackball and the like. Typically, data relating to the textile concerns style, color, pattern and size of the good. Thus, the purchaser or user may select and enter according data by selecting these from the database.

In one possible embodiment, the input component 16 is linked to a body scanner device 20 which allows for a user to determine automatically his or her precise body size which information is then provided directly and digitally to the system. Alternatively, a user may take measurements (of his body size or, in case of home or office decoration of the object to be decorated) in the old-fashioned manner with a tape measure and type the data into the system, or he or she may select an appropriate size from a selection of standard sizes provided by the database. The input component may be either textual or graphical, and may include interfaces such as web-based interfaces that include provide a user with a form to be filled out. The data submitted by the user via the input component may be processed locally within the computer 10 or remotely at a server (as described in greater detail below) before passing the input information to the ordering component 14 and/or retrieving component 12. Various protocols for exchanging information via the input component (or between any other components described herein) can be used, e.g., HTTTP, HTTPS, FTP.

The client system 5 can include a home or personal computer system set up in a person's private area or in a retail store or another so-called Point of Sale (POS).

The ordering component 14 of the client system 5 then generates a request for manufacture based on the data selected by the user. This request for manufacture is sent to the manufacturing system M linked to the client system 5. The manufacturing system M can be of any of the kind described above, i.e. any of the manufacturing system M1, M2, M3, M4 of FIGS. 3a, 3b, 4 or 7, or of any other suitable kind. (The links between systems and components described herein may be any one or a combination of unsecured links and secured links (e.g., links using Virtual Private Network (VPN) technology).

The request for manufacture is received by the receiving component 30 of the manufacturing system and passed on to the generating component 40 which analyses the content of the request and generates an according order for manufacturing the requested customized textile fabric. The receiving component may include a communications adapter for receiving information from a remote computer or any direct connection technology for receiving information from a remote computer. Such a communications adapter may be wired or wireless, and may include any known or future hardware protocol (e.g., Ethernet, Token-ring, ATM, FDDI, etc.). Also, the communications protocol used over the adapter may be any known protocol (e.g., TCP/IP, UDP/IP, etc.) and may include communication over a local area network (LAN) or a Wide Area Network (WAN), such as the Internet. The direct connection technology may include any one or a combination of serial, USB, Firewire and other peripheral component protocols.

In case of a manufacturing system which is designed to only handle cut and sewn fabrics, the request may only comprise standard sizes which are available to the handling component 70. Therefore, the generating component 40 first checks whether the size requirement is met, and then passes the generated order on to the order fulfilment component 50 which generates fulfilment control instructions being forwarded to the control component 60.

In case of the manufacturing system M1 which is designed to handle unsewn and uncut fabrics only, the order fulfilment component 50 generates control instructions for the cutting operation 80 on the basis of the size and style or shape information contained in the request of the user as well as control instructions for the subsequent sewing operation.

In case of the manufacturing system M4 shown in FIG. 7 which is designed to handle both uncut and pre-cut fabrics, the selection component 45 would check whether the data provided by the user in his or her request can be met with a pre-cut (e.g. standard size) fabric on stock or whether it requires cutting of uncut material and then select to use uncut or pre-cut material, and depending thereon prompt the order fulfilment component 50 to generate order fulfilment control instructions in response to this selection.

As a next step, the control component 60 controls the execution of the fulfilment instructions by the handling component 70 and, the case given, the cutting operation 80, as well as the digital printing apparatus 90, the uncolored fabric inventory material being subsequently cut, printed and sewn in a combined process in order to obtain a finished customized textile good according to the request of the user. The sewing process can be performed in a sewing operation by means of a sewing apparatus (now shown) located in line after or before the digital printing apparatus 90.

Figure 5:
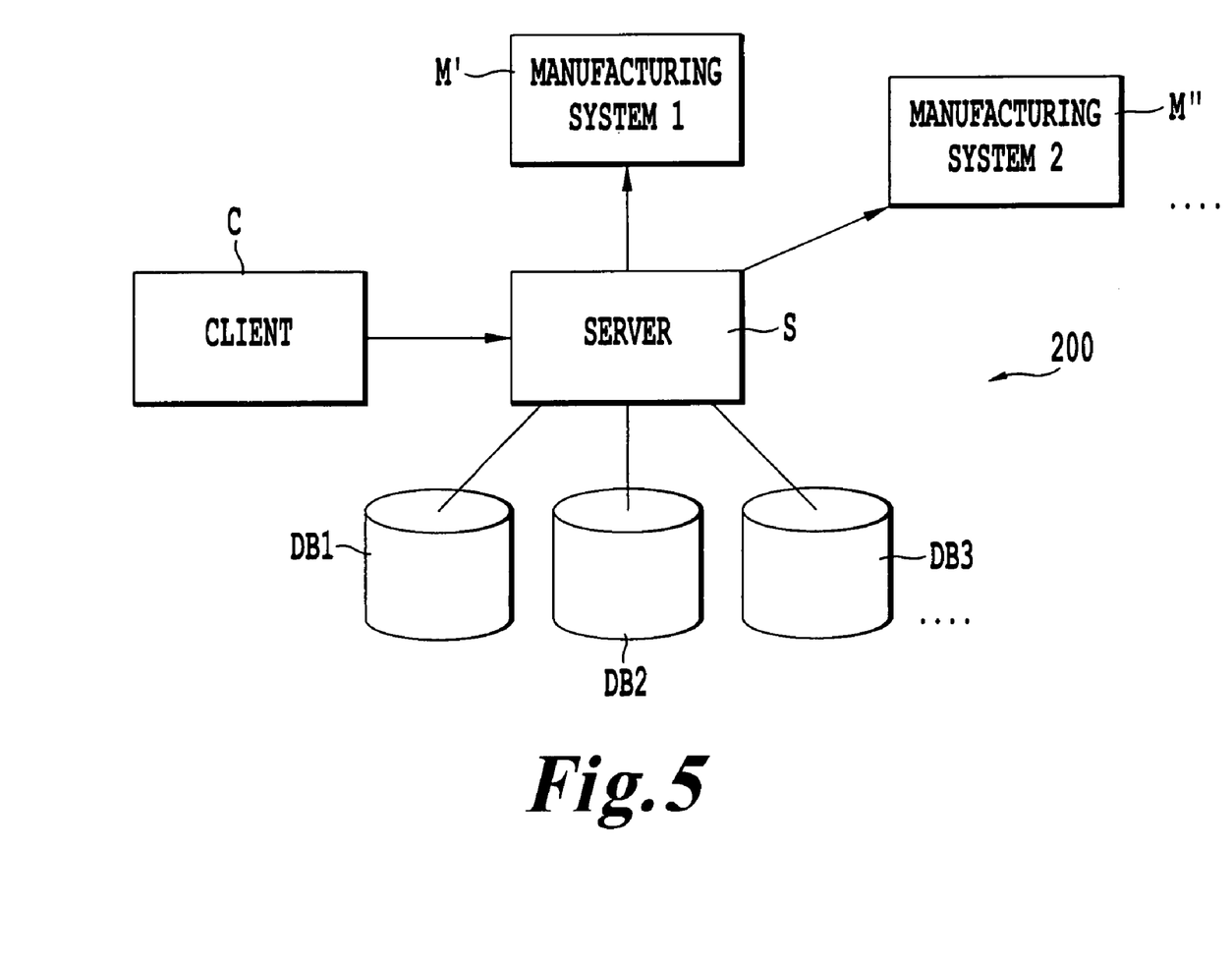
FIG. 5 is a diagrammatic depiction of a second embodiment of a system for customized industrial textile coloration according to the invention comprising a client system which is linked with two manufacturing systems via a server system.

FIG. 5 shows a further embodiment of a system for customized industrial textile coloration 200. The system 200 shown in FIG. 5 comprises a client system 5 which may be of the kind as described above. Unlike the client system 5 of the embodiment described in connection with FIG. 2, the client system 5 of the system 200 of the second embodiment is not connected directly to one or more databases, but is rather linked to a central server S which in turn is linked to the one or more databases DB1, DB2, DB3 (the depiction of the embodiment in FIG. 5 being limited to three databases for illustrative purposes only; it will be understood that any appropriate number of databases can be linked to the server S). Further, the server is linked to one or more manufacturing systems M', M" (the depiction of the embodiment in FIG. 5 being limited to two manufacturing systems for illustrative purposes only; it will be understood that the server S can be linked to any appropriate number of manufacturing systems).

In operation, the embodiment of the system 200 shown in FIG. 5 offers a larger variety of possibilities to the user. A person using the client system would not necessarily realize any difference as the handling from the client side of the system remains the same, i.e. retrieval of information from one or more databases, custom selecting data and generating a request of manufacture on the basis of the selected (and possibly inputted) data.

However, with the second embodiment as shown in FIG. 5, retrieval of the database information is performed via the central server S and allows the system to use a variety of databases, which databases may be owned and run by different owners (retailers, brand owners, designers, etc.). There can be databases which contain a complete set of information data needed to order a customized textile good (such as style, size, color, pattern, cloth or fabric type, etc.), and there may also be databases which are "specialized" databases and would only contain specific data, such as for example only patterns, or only colours. Such specialized databases could, for example, be run by designers offering their pattern or color designs to be combined with style, size and cloth or fabric type data from other databases. The server S would be designed and set up to decide which databases could be combined and which databases could not be combined and provide database contents of the various databases in an according manner to the user. This could for example be done by omitting database contents in connection with other database content already on display for the user, or by providing according indications to the user as to the possibilities of combination of displayed data.

Further, upon a selection of the user, the central server S could decide which of the manufacturing systems linked to the server would be the appropriate one to manufacture the requested customized colored textile fabric and forward the request of the user originating from the client system to the selected manufacturing system. This means that the server S can play the role of a portal serving a high number of retail client systems by connecting them to a variety to manufacturing systems and finding best offers, best combinations etc. Likewise, the central server may divide up orders to multiple manufacturing systems in order to increase throughput through parallelization and/or load-balancing. Manufacturing systems may also be selected in a pre-defined order based on past experiences (e.g., based on past quality or timeliness).

Figure 6:
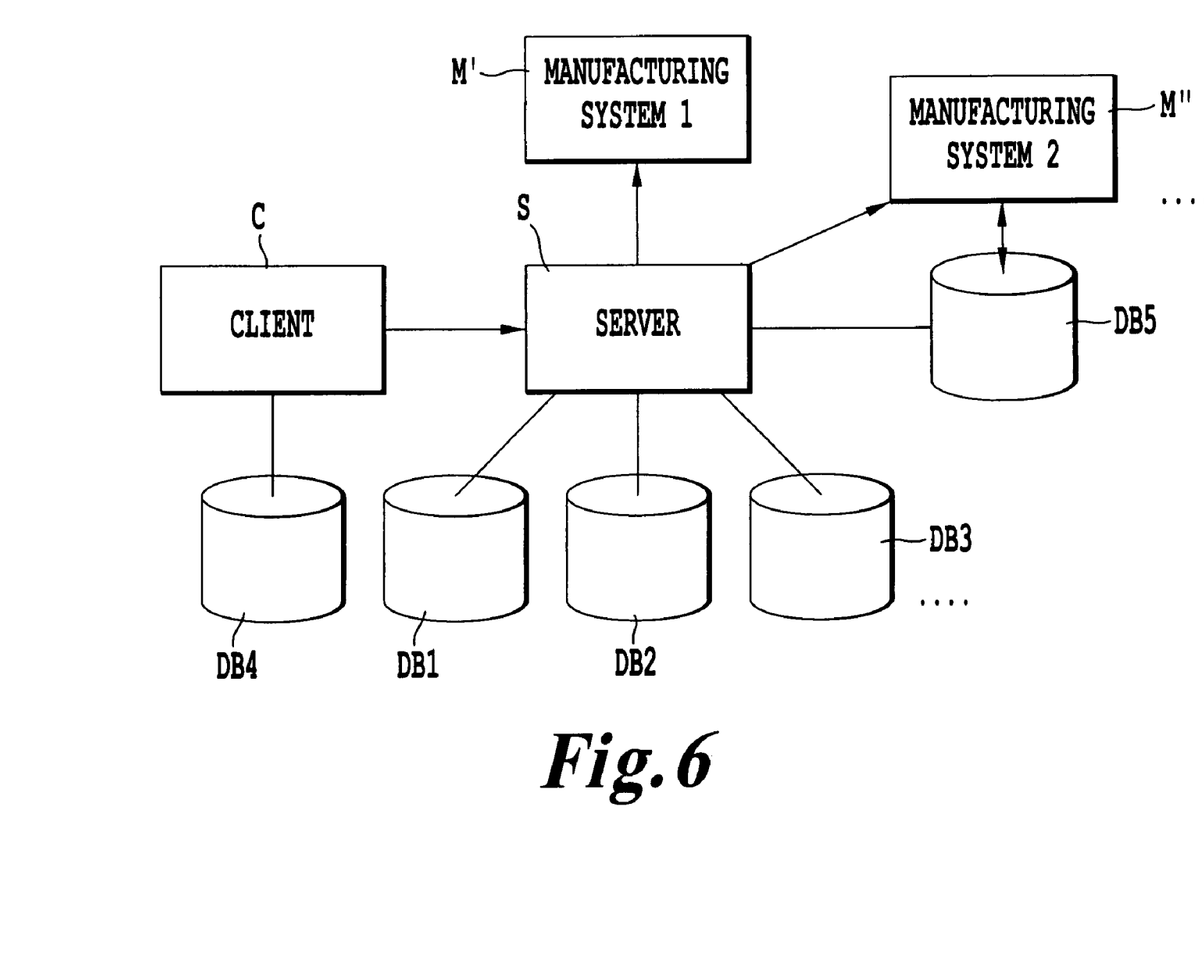
FIG. 6 is a diagrammatic depiction of an alternative embodiment of the system for customized industrial textile coloring according to the invention shown in FIG. 5.

Consequently and as will be appreciated by the person skilled in the art, all kinds of variations as to the set-up of the system of the invention are possible, as indicated by the illustration of FIG. 6 where—in comparison to the system shown in FIG. 5—an additional database DB4 is connected directly to the client system 5, and an additional database DB5 is connected to both the server S and the second manufacturing system M". The database DB4 connected to the client system 5 might be owned and run by the owner of the POS client system who wants to provide his customers with additional choice of data, and the database DB5 connected to the second manufacturing system M" might be owned and run by the owner of this manufacturing system who provides his own range or collection of clothing parameters like design, style and/or pattern or special fabric quality and offers this range via the server S. The cutting and sewing operations performed in the manufacturing system can be set up to be performed manually, semi-automated or fully automated, depending on the technologies used.

As already outlined above, the invention provides for a system and method for customized industrial textile coloring (i.e. dyeing or printing) which allows for a manufacturing of a customized textile fabric within very short delays (lead times). It may even be possible to reduce the lead times to on the order of 1 to 30 days versus lead times of up to 10 weeks in the state of the art of conventional textile manufacturing.

The production of fashion driven goods strongly depends on the speed and time the product can be delivered to the customer. In the case of customized textiles, this is a very crucial point. However, existing textile supply chains are complex, long and inefficient, particularly due to screen printing. In contrast, the invention has realized the efficiency of a combined and integrated system using digital coloring and producing the colored fabric at the manufacturing and sewing site. This allows for reduced stocks and transport costs as the uncolored fabric is stocked on site only and is then colored and sewn in a combined process. Therefore, only requested products are shipped. Stock costs are reduced particularly with the retailers who will not have to provide (and pay) for large stocks. The waste of textile due to being out of fashion because they were on stock too long is reduced as well as the loss of profit due to mark downs at the end of a fashion cycle season. Moreover lost sales which often occur in long lead time supplies when a textile good is not available at the right size or with the matching color, is reduced, when customised coloration systems are applied.

The present invention may industrially produce mass textile goods and be the basis for a business model of running a system according to the invention, bringing together brand owners and retailers, cutting and sewing companies, digital print operations, digital printer manufacturers as well as manufacturers of chemicals and inks required for coloring, i.e. printing or dyeing.

In computer-based implementations of the above-functionality, a computer program product with computer code embedded therein may be used to control a CPU to achieve that functionality. That computer program product may be utilized in conjunction with other computer programs, e.g., operating systems and/or other business tools suites (e.g., Microsoft OFFICE).

The computer program product may be run on either a single processor system or a multiprocessor system.

The invention claimed is:

1. A method for performing mass customization of industrial textile goods, comprising:
   under control of a client system:
   retrieving information relating to the design of a customized textile good to be manufactured;
   selecting from one database desired design data; and
   sending the selected design data as a request to manufacture a production run lot of the customized textile good to a manufacturing system; and
   under control of a manufacturing system:
   receiving the request to manufacture the customized textile good;
   generating an order for manufacturing the customized textile good;
   providing uncut uncolored fabric inventory material; and
   subsequently performing in any order (a) coloring, utilizing a digital coloration apparatus, (b) cutting and (c) sewing the colored or uncolored fabric inventory material in a combined process in order to obtain the production run lot of the finished customized textile good according to the request.

2. A method according to claim 1, further comprising inputting additional individual data relating to an identification of a purchaser.

3. A method according to claim 1, further comprising inputting additional individual data relating to a size of the customized textile good to be manufactured.

4. A method according to claim 2, wherein the additional individual data is inputted manually.

5. A method according to claim 1, wherein the at least one database contains data as to patterns, style, fabric quality and colors a purchaser can select from.

6. A method according to claim 1, further comprising verifying the selected design data contained in the request as to compatibility with individual design criteria.

7. A method according to claim 1, wherein said uncut uncolored fabric inventory material is provided from a roll of fabric.

8. A method for performing mass customization of industrial textile goods, comprising:
   under control of a client system:
   retrieving information relating to the design of a customized textile good to be manufactured;
   selecting from one or more databases desired design data; and
   sending the selected data as a request to manufacture a production run lot of the customized textile good to a manufacturing system; and
   under control of the manufacturing system:
   receiving the request;
   generating an order for manufacturing the customized textile good;
   providing pre-cut uncolored fabric inventory material; and
   coloring, using a digital coloration apparatus, the pre-cut uncolored fabric inventory material and sewing in order to obtain the production run lot of the finished customized textile good according to the request.

9. A method according to claim 8, further comprising inputting additional individual data relating to an identification of a purchaser.

10. A method according to claim 8, further comprising inputting additional individual data relating to a size of the desired customized textile good to be manufactured.

11. A method according to claim 9, wherein the additional individual data is inputted manually.

12. A method according to claim 8, wherein the at least one database contains data as to patterns, style, fabric quality and colors a purchaser can select from.

13. A method according to claim 8, further comprising verifying the selected design data contained in the request as to compatibility with individual design criteria.

14. A method for performing mass customization of industrial textile goods, comprising:
   under control of a client system:
   retrieving information relating to the design of a customized textile good to be manufactured;
   selecting from at least one database desired design data; and
   sending the selected data as a request to manufacture a production run lot of the customized textile good to a manufacturing system; and
   under control of the manufacturing system:
   receiving the request;
   generating an order for manufacturing the customized textile good;
   providing pre-cut and pre-sewn uncolored inventory material; and
   coloring the pre-cut and pre-sewn uncolored inventory material, utilizing a digital coloration apparatus, in order to obtain the production run lot of the finished customized textile good according to the request.

15. A method according to claim 14, further comprising inputting additional individual data relating to an identification of a purchaser.

16. A method according to claim 14, further comprising inputting additional individual data relating to a size of the customized textile good to be manufactured.

17. A method according to claim 14, wherein the at least one database contains data as to patterns, style, fabric quality and colors the purchaser can select from.

18. A method according to claim 14, further comprising verifying the selected design data contained in the request as to compatibility with individual design criteria.

19. A method for performing mass customization of industrial textile good, comprising:
   under control of a client system:
   retrieving information relating to the design of a customized textile good to be manufactured;
   selecting from at least one database desired design data; and
   sending the selected data as a request to manufacture a production run lot of the customized textile good to a manufacturing; and
   under control of the manufacturing system:
   receiving the request;
   generating an order for manufacturing the customized textile good; and
   depending on the request, selecting to either provide uncut or pre-cut uncolored fabric inventory material;
   in the case of selecting to provide uncut uncolored fabric inventory material:
   providing uncut uncolored fabric inventory material; and
   subsequently coloring, cutting and sewing the uncolored fabric inventory material in a combined process in order to obtain the production run lot of the finished customized textile fabric according to the request;
   in the case of selecting to provide pre-cut uncolored fabric inventory material:

providing pre-cut uncolored fabric inventory material; and coloring the pre-cut uncolored fabric inventory material in order to obtain a the production run lot of the finished customized textile fabric according to the request, wherein coloring of the uncolored fabric inventory material utilizes a digital coloring apparatus.

20. A method according to claim 19, wherein the step of selecting to either provide uncut or pre-cut uncolored fabric textile material is determined on the basis of the selected design data contained in the request.

21. A method according to claim 19, further comprising inputting additional individual data relating to an identification of a purchaser.

22. A method according to claim 19, further comprising inputting additional individual data relating to a size of the customized textile good to be manufactured.

23. A method according to claim 19, wherein the at least one database contains data as to patterns, style, fabric quality and colors a purchaser can select from.

24. A method according to claim 19, further comprising verifying the selected design data contained in the request as to compatibility with individual design criteria.

25. A client system for ordering initiating mass customization of textile goods, comprising:

a retrieving component for retrieving information relating to the design of a customized textile good from at least one database;

a display component for displaying said retrieved information;

an input component for selecting desired design data from said displayed information; and an ordering component which in response to completion of the selection of desired design data sends a request to manufacture a production run lot of the customized textile good to a manufacturing system.

26. A manufacturing system for performing mass customization of textile goods, comprising:

a receiving component for receiving a request to manufacture a production run lot of customized textile goods containing custom selected data;

a generating component for generating an order of manufacture from the received request;

an order fulfillment component for generating order fulfilment control instructions;

a handling component for providing uncolored inventory material in response to said instructions;

a digital coloration apparatus for coloring said uncolored inventory material in response to said; and an instruction execution control component for controlling the execution of said fulfilment control instructions by said handling component and said digital coloring apparatus to manufacture the production run lot of the customized textile good.

27. A system according to claim 26, wherein the handling component provides uncut and uncolored fabric inventory material.

28. A system according to claim 26, wherein the handling component provides pre-cut uncolored fabric inventory material, said system further comprising a sewing apparatus for performing a sewing operation in order to sew and cut fabric pieces, said sewing operation being controlled by said instruction execution control component.

29. A system according to claim 26, wherein the handling component provides pre-cut and pre-sewn uncolored inventory material.

30. A system according to claim 26, further comprising:

a selection component for selecting to either provide uncut or pre-cut uncolored fabric inventory material on the basis of said request and prompting said order fulfilment component to generate order fulfilment control instructions in response to said selection, said handling component providing uncut or pre-cut uncolored fabric inventory material in response to said instructions.

31. A system for performing mass customization of industrial textile goods, comprising:

at least one client system for ordering customized textile goods comprising the following components:

at least one retrieving component for retrieving information relating to the design of a customized textile good from at least one database;

at least one display component for displaying said retrieved information;

at least one input component for selecting desired design data from said displayed information; and at least one ordering component which in response to completion of the selection of desired design data sends a request to manufacture a production run lot of the customized textile good to a manufacturing system; and at least one manufacturing system for manufacturing a customized textile good comprising:

a receiving component for receiving a request for manufacture of customized textile goods containing custom selected data;

a generating component for generating an order of manufacture;

an order fulfilment component for generating order fulfilment control instructions;

a handling component for providing uncolored inventory material in response to said instructions;

a digital coloration apparatus for coloring said uncolored inventory material in response to said; and an instruction execution control component for controlling the execution of said fulfilment control instructions by said handling component and said digital coloring apparatus to manufacture the production run lot of the customized textile good.

32. A system according to claim 31, further comprising: a server system linked to (1) said at least one client system and (2) to at least one database containing design data for customized textile goods, said client system retrieving said information to be displayed through said server system.

33. A system according to claim 32, wherein said server system is further linked to a corresponding one of said at least one manufacturing system and wherein said request from said client system is forwarded to the corresponding one of said at least one manufacturing system by said server system.

34. A system according to claim 32, said server system further comprising a verification component for verifying compatibility of the design data selected by a user of said client system from different databases.

35. A system according to claim 34, wherein said server system is linked to a plurality of manufacturing systems and further comprises a determination component for determining an appropriate manufacturing system in view of compatibility of said selected design data, and forwarding said request from said client system to said appropriate manufacturing system.

36. A computer program product with a computer-readable medium and a computer program stored on the computer-readable medium with program code configured to carry out a method according to any one of claims 1, 8, 14 and 19 when the computer program is executed on a computer.

37. A computer-implemented method configured to carry out a method according to any one of claims 1, 8, 14 and 19 when the computer program is executed on a computer.

38. The method as claimed in claim 1, further comprising:
inputting additional individual data; and
sending the additional individual data as part of the request for manufacture to the manufacturing system.

39. The method as claimed in claim 8, further comprising:
inputting additional individual data; and
sending the additional individual data as part of the request for manufacture to the manufacturing system.

40. The method as claimed in claim 14, further comprising:
inputting additional individual data; and
sending the additional individual data as part of the request for manufacture to the manufacturing system.

41. The method as claimed in claim 19, further comprising: inputting additional individual data; and
sending the additional individual data as part of the request for manufacture to the manufacturing system.

42. The client system as claimed in claim 25, wherein the input component further comprises a component for inputting additional individual data.

43. A method for initiating mass customization of industrial textile goods, comprising:
retrieving information relating to the design of a customized textile good to be manufactured;
selecting from at least one database desired design data; and
sending the selected design data as a request to manufacture a production run lot of the customized textile good to a manufacturing system.

44. The method as claimed in claim 43, further comprising:
inputting additional individual data; and
sending the additional individual data as part of the request for manufacture to the manufacturing system.

45. A method for performing mass customization of industrial textile goods, comprising:
receiving a request for manufacture of a customized textile good;
generating an order for manufacturing the customized textile good;
providing uncut uncolored fabric inventory material; and
subsequently performing in any order (a) coloring, utilizing a digital coloration apparatus, (b) cutting and (c) sewing the uncolored fabric inventory material in a combined process in order to obtain a production run lot of a finished customized textile good according to the request.

46. A method according to claim 44, wherein the additional individual data comprises data relating to the identification of the purchaser.

47. A method according to claim 44, wherein the additional individual data comprises data relating to the size of the desired customized textile good to be manufactured.

48. A method according to claim 44, wherein the additional individual data is inputted manually.

49. A method according to claim 43, wherein the at least one database contains data as to patterns, style, fabric quality and colors a purchaser can select from.

50. A method according to claim 43, further comprising verifying the selected design data contained in the request as to compatibility with the individual design criteria.

51. A method according to claim 45, wherein said uncut uncolored fabric inventory material is provided from a roll of fabric.

52. The method of claim 1, wherein the request to manufacture is received from at least one of a seller and an owner of the textile goods at the point of sale.

53. The method of claim 8, wherein the request to manufacture is received from at least one of a seller and an owner of the textile goods.

54. The method of claim 14, wherein the request to manufacture is received from at least one of a seller and an owner of the textile goods.

55. The method of claim 19, wherein the request to manufacture is received from at least one of a seller and an owner of the textile goods.

56. The method of claim 43, wherein the request to manufacture is received from at least one of a seller and an owner of the textile goods.

57. The method of claim 45, wherein the request to manufacture is received from at least one of a seller and an owner of the textile goods.

* * * * *